Patented Feb. 26, 1929.

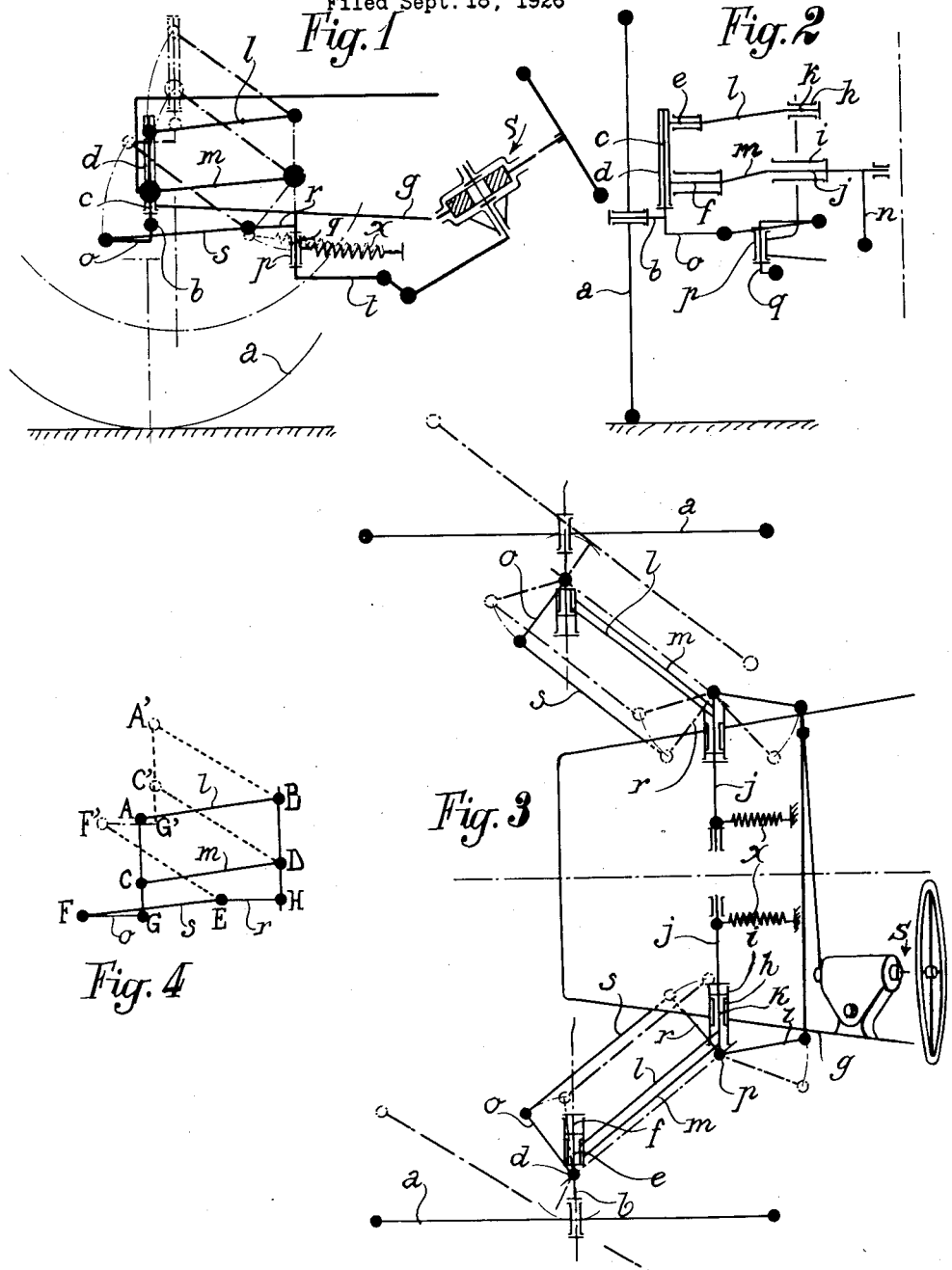

1,703,792

UNITED STATES PATENT OFFICE.

PIERRE SPIRE AND LUCIEN ROLLAND, OF ROANNE, FRANCE.

SUSPENSION, STEERING GEAR, AND BRAKING GEAR FOR AUTOMOBILES.

Application filed September 18, 1926, Serial No. 136,324, and in France September 22, 1925.

The present invention refers to a steering gear for automobiles.

It is known that the ordinary method of mounting each pair of wheels on a common axle leads to many drawbacks, one of which is the weight of the unsuspended parts, and another the fact that the steering angle is somewhat dependent upon the angle between the axle and the frame. This is a source of strains in the steering gear and may cause a break.

It has also been sought to suspend the wheels separately, but the devices hitherto proposed have been uncertain and somewhat complicated.

According to the present invention, the wheels are suspended separately, and each one is supported by two parallel levers which form an articulated parallelogram. The steering angle is controlled by a rod which connects two equal and parallel levers, one of which is supported by the frame, the other one being rigid with the bearing which supports the journal of the wheel.

The annexed drawings diagrammatically show a device according to the invention.

Figure 1 is a side elevation in which the brakes and their gearing are omitted for the sake of clearness;

Fig. 2 is a front view;

Fig. 3 is a plan view;

Fig. 4 is a diagram representing the working.

The wheel $a$ is disposed in a vertical plane and is supported by a journal $b$ which is integral with or rigidly secured to a pivot $c$, the latter being supported by a gearing $d$. The axis of pivot $c$ is supposed to be vertical, but this is not necessary. Bearing $d$ is provided with two parallel journals $e$ and $f$ which are approximately perpendicular to the plane of the wheel. The frame $g$ is provided with two bearings $h$ and $i$ the axes of which are parallel, the distance between these axes being equal to the distance between the axes of the parallel journals $e$ and $f$.

The articulated parallelogram mentioned above is formed by two equal levers $l$ and $m$ provided at one end with journals $k$ and $j$, respectively, engaging the bearings $h$ and $i$ of the frame, and articulated at the other end on the journals $e$ and $f$. These levers $l$ and $m$ are not disposed perpendicularly to the axes of parts $e$, $f$, $h$, and $i$ (see Fig. 3) in order to permit a sufficient steering angle of the wheels.

On journal $j$ is keyed a lever $n$ which is acted upon by a spring $x$ or the like which insures the elastic suspension of the car.

Pivot $c$ has a lever $o$ connected to it, and frame $g$ is provided with a bearing $p$ the axis of which is parallel to the axis of pivot $c$ and is located in the vertical plane of the axes of bearings $h$ and $i$. An axle $q$ is rotatable in bearing $p$ and is provided with a lever $r$ equal in length to and parallel with lever $o$. Levers $o$ and $r$ are connected by a rod $s$, and the position of lever $r$ is such that the projection of rod $s$ on a plane perpendicular to the axes of the parts $e$, $f$, $h$ and $i$ is parallel to the projection on this same plane of levers $l$ and $m$. Such a plane is, for instance, the plane of Fig. 1.

The parallelogram formed by the levers $l$ and $m$ supports the car by the action of springs or the like on lever $n$. Steering is effected by a conventional mechanism S which is connected at opposite sides of the car with two levers $t$ which are themselves rigidly attached to the axles $q$; the latter being connected through the levers $r$ and $o$ and rods $s$ to the pivots $c$ which serve to swing the wheels $a$.

Fig. 4 is a projection on a plane perpendicular to the axes of parts $e$, $f$, $h$ and $i$. AB is the projection of lever $l$, CD is the projection of lever $m$, EF is the projection of rod $s$, FG is the projection of lever $o$ and EH is the projection of lever $r$. The normal position is represented in full lines, and the dotted lines represent the position when the wheel has been raised by an inequality on the road.

As indicated above, the projection EF of rod $s$ is parallel to the projections AB and CD of levers $l$ and $m$ in the normal position. Levers $o$ and $r$ being equal and parallel, EH and FG are equal and parallel. EFGH is, therefore, a parallelogram and FE=GH. As FE is parallel with CD and AB, GH is also parallel with CD and AB, and CDGH is a parallelogram. CD is, therefore, equal to GH and to EF.

It is now assumed that the parts move into the position shown in dotted lines and that the rod $s$ being taken off, the wheel is given exactly the same orientation as in the first position. Lever $o$ is then in a position parallel to its normal position, and its projection F'G' will be equal and parallel to FG and EH. As ABCD is an articulated parallelogram, AC is parallel and equal to A'C' and therefore F'G'EH is a parallelogram. EF'=

HG'=C'D=CD, and, as CD=EF, EF'= EF. When the steering angle is constant, the length EF remains constant. Conversely, with the provision of rod $s$, the length EF is maintained constant and the steering angle remains constant, which is the purpose of the invention.

We claim as our invention:—

A steering gear for automobiles and the like, comprising, in combination, a suspension by articulated parallelogram, a lever fixed to the pivot which supports the wheel, a lever fixed to an axle supported by the frame, said levers being equal and parallel, and a rod connecting said levers, the projection of said rod on a plane perpendicular to the axes of articulation of said parallelogram being equal and parallel to the projections on the same plane of the levers forming the sides of said articulated parallelogram.

In testimony whereof we affix our signatures.

PIERRE SPIRE. [L. S.]
LUCIEN ROLLAND. [L. S.]